Aug. 18, 1925.

F. E. FORD 1,550,531

RAY DEFLECTOR FOR AUTOMOBILE HEADLIGHTS

Filed Aug. 15, 1923    2 Sheets-Sheet 1

Inventor

Franklin E. Ford.

By Mason Fenwick & Lawrence

Attorneys

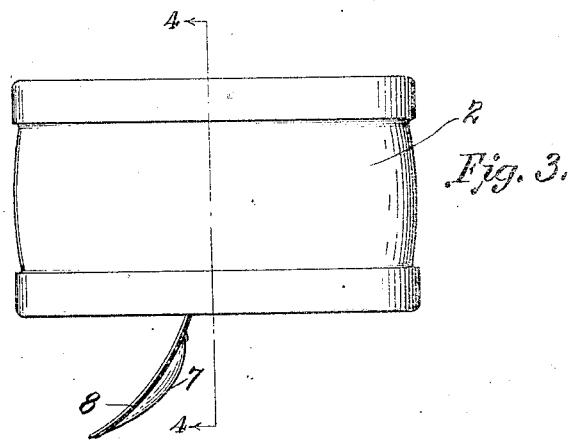
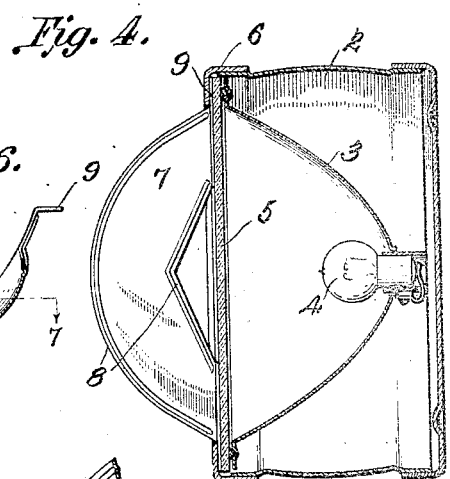
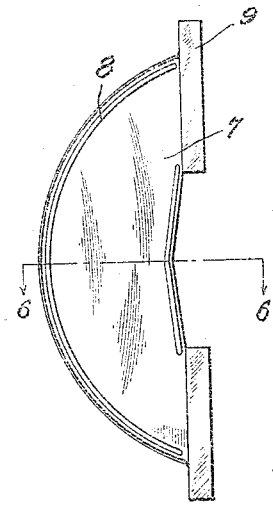
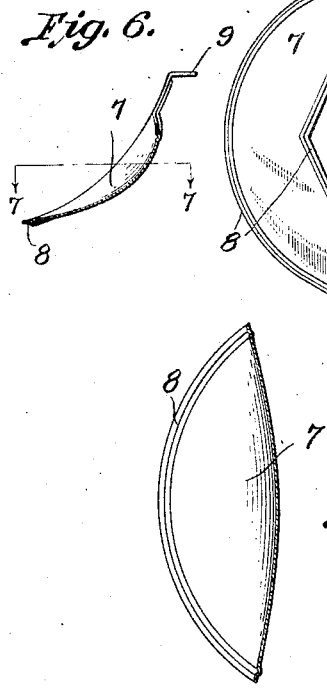

Patented Aug. 18, 1925.

1,550,531

UNITED STATES PATENT OFFICE.

FRANKLIN E. FORD, OF MONTGOMERY, ALABAMA.

RAY DEFLECTOR FOR AUTOMOBILE HEADLIGHTS.

Application filed August 15, 1923. Serial No. 657,615.

*To all whom it may concern:*

Be it known that I, FRANKLIN E. FORD, citizen of the United States, residing at Montgomery, in the county of Montgomery and State of Alabama, have invented certain new and useful Improvements in Ray Deflectors for Automobile Headlights; and I do hereby declare the following to be a full, clear, and exact description of the invention, such as will enable others skilled in the art to which it appertains to make and use the same.

This invention relates to improvements in ray deflectors for automobile headlights and more particularly to deflectors which will be securely held on the outside of the said headlights between the customary lens and the rim of the headlights.

An object of the invention is to provide a removable reflector for automobile headlights which will be positioned in front of the lens therefor and which will utilize the indirect rays from the said headlights to illuminate the opposite sides of the road.

Another object of the invention is to provide a removable reinforced deflector, paraboloidal in shape which may be positioned between the lens of a headlight and the rim therefor and which will utilize the indirect rays from the bulb in said headlight to illuminate the road at the side and in front of an automobile equipped with the same.

A further object of the invention is to provide a suitable deflector for automobile headlights which will be positioned on the exterior thereof for throwing a portion of the light from said headlights to the opposite sides of the road.

A still further object of the invention is to provide a suitable ray deflector for automobile headlights which will be highly efficient in use and which will be quite inexpensive to manufacture.

Other objects will appear as the description proceeds.

In the accompanying drawings which form a part of my application,

Fig. 3 is a plan view of an automobile headlight equipped with a ray deflector.

Fig. 4 is a sectional view taken on the line 4—4 of Fig. 3.

Fig. 5 is an elevation of the deflector.

Fig. 6 is a sectional view taken on the line 6—6 of Fig. 5, and

Fig. 7 is a sectional view taken on the line 7—7 of Fig. 6.

Like characters of reference will appear throughout the following specification and the accompanying drawings to designate corresponding parts.

Figure 1:
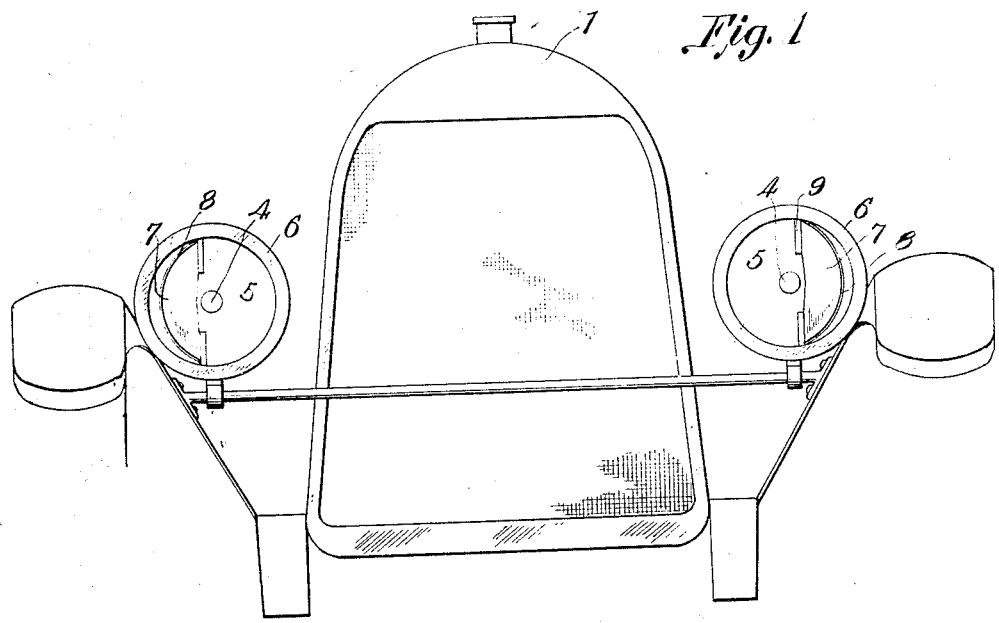
Fig. 1 is a front elevation of a portion of an automobile equipped with my improved ray deflectors.
Figure 2:
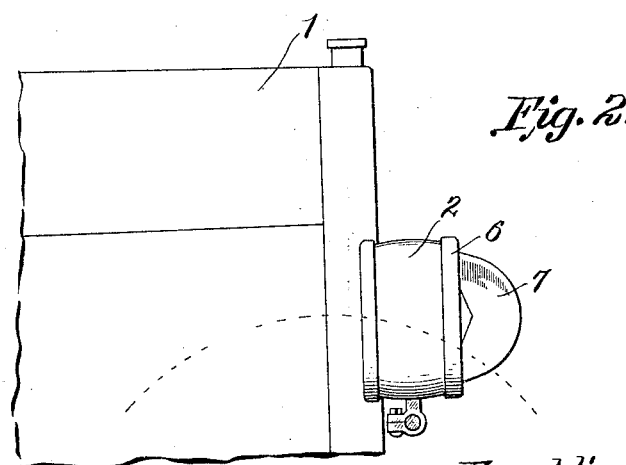
Fig. 2 is a side elevation of a portion of an automobile showing the headlights therefor equipped with my ray deflector.

The headlights of an automobile 1 are formed with the usual body portion 2, reflector 3 and electric bulb 4. A lens 5 of usual construction securely held in position in front of the reflector 3 by means of the rim 6 which may be suitably attached to the body portion 2 of the headlight.

My improved invention consists in forming a paraboloidal reflector or deflector 7, the construction of which is more clearly shown in Fig. 5 of the drawings. This reflector is provided with reinforced or strengthened edges 8 and at its opposite sides with the angularly disposed and outwardly extending extensions or clips 9 which are adapted to be positioned between the front edge of the lens and the rear or inner surface of the headlight rim. It will be apparent that when these clips 9 are positioned between the lens and the rim and the rim is securely tightened in place, the said reflector will be held in fixed position.

In use, I intend to have the reflector placed in a substantially perpendicular position and slightly to the outside of the line of center of said lens. It will therefore be apparent that the direct rays from the lamp bulb will not in any manner be obstructed, while the indirect rays reflecting from the customary headlight reflector will be reflected off of the supplemental deflector in such a manner as to illuminate the opposite sides of the road.

As the deflector 7 is curved both longitudinally and transversely the light deflected therefrom will be substantially uniform.

Many minor changes and detail of construction may be resorted to without departure from the spirit of the invention.

Having thus described my invention what I claim as new and desire to secure by Letters Patent of the United States is:—

The combination with a pair of laterally spaced headlights having the usual reflectors and lenses of reinforced deflectors mounted vertically in front of said headlights and lenses, and to the far or outer side of a vertical line drawn therethrough, whereby light rays will be directed from said deflectors to the adjacent side of the road, while direct unobstructed rays of light will be directed forwardly from the headlight reflectors, and means formed integrally at the opposite ends of said deflectors adapted to be positioned between the lense and the rims of the headlights to hold the deflectors in operative position.

In testimony whereof I affix my signature.

FRANKLIN E. FORD.